No. 674,377. Patented May 21, 1901.
C. W. DICKINSON.
SULKY PLOW.
(Application filed Apr. 9, 1900.)
(No Model.) 3 Sheets—Sheet 1.
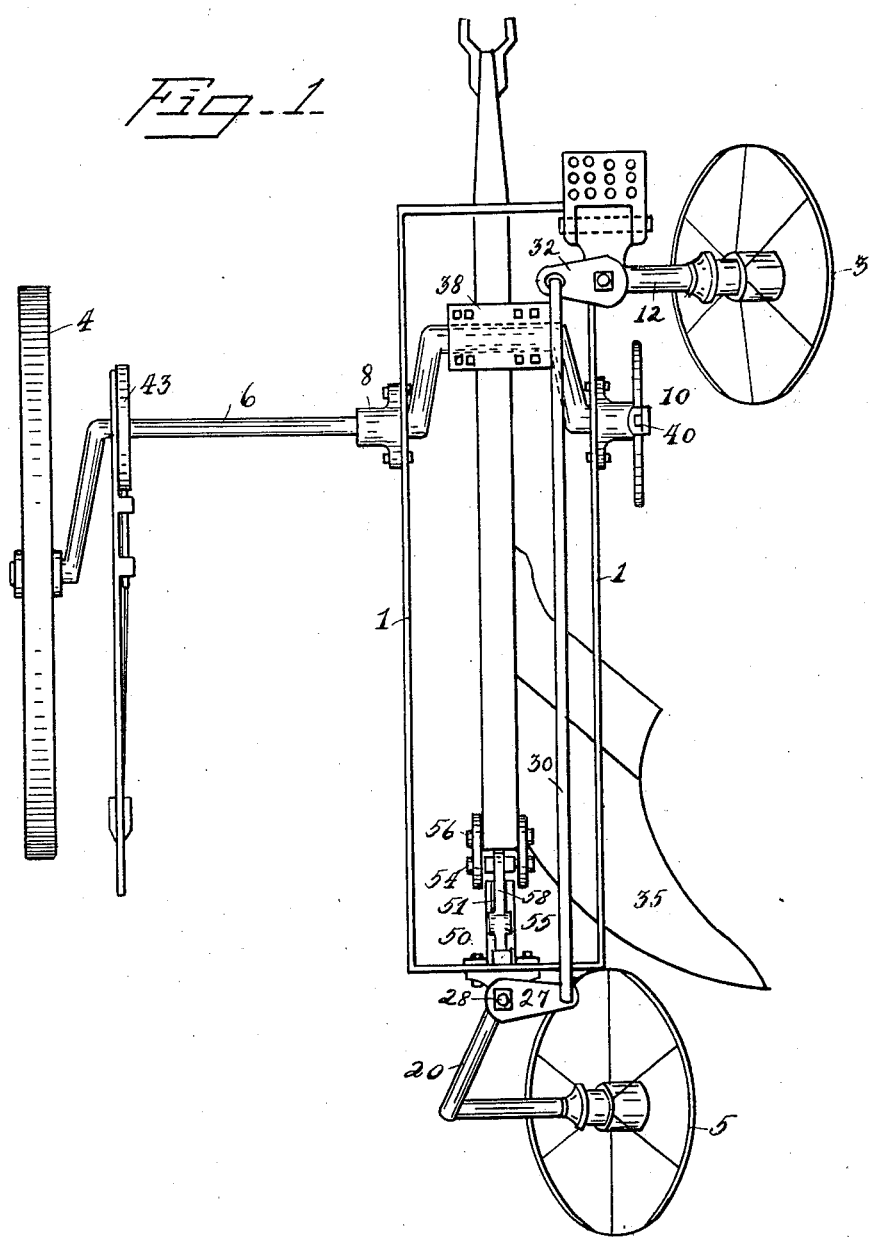
WITNESSES:
E. E. Cady
J. Kelley
INVENTOR.
Clinton W. Dickinson
BY
M. M. Cady
ATTORNEY.

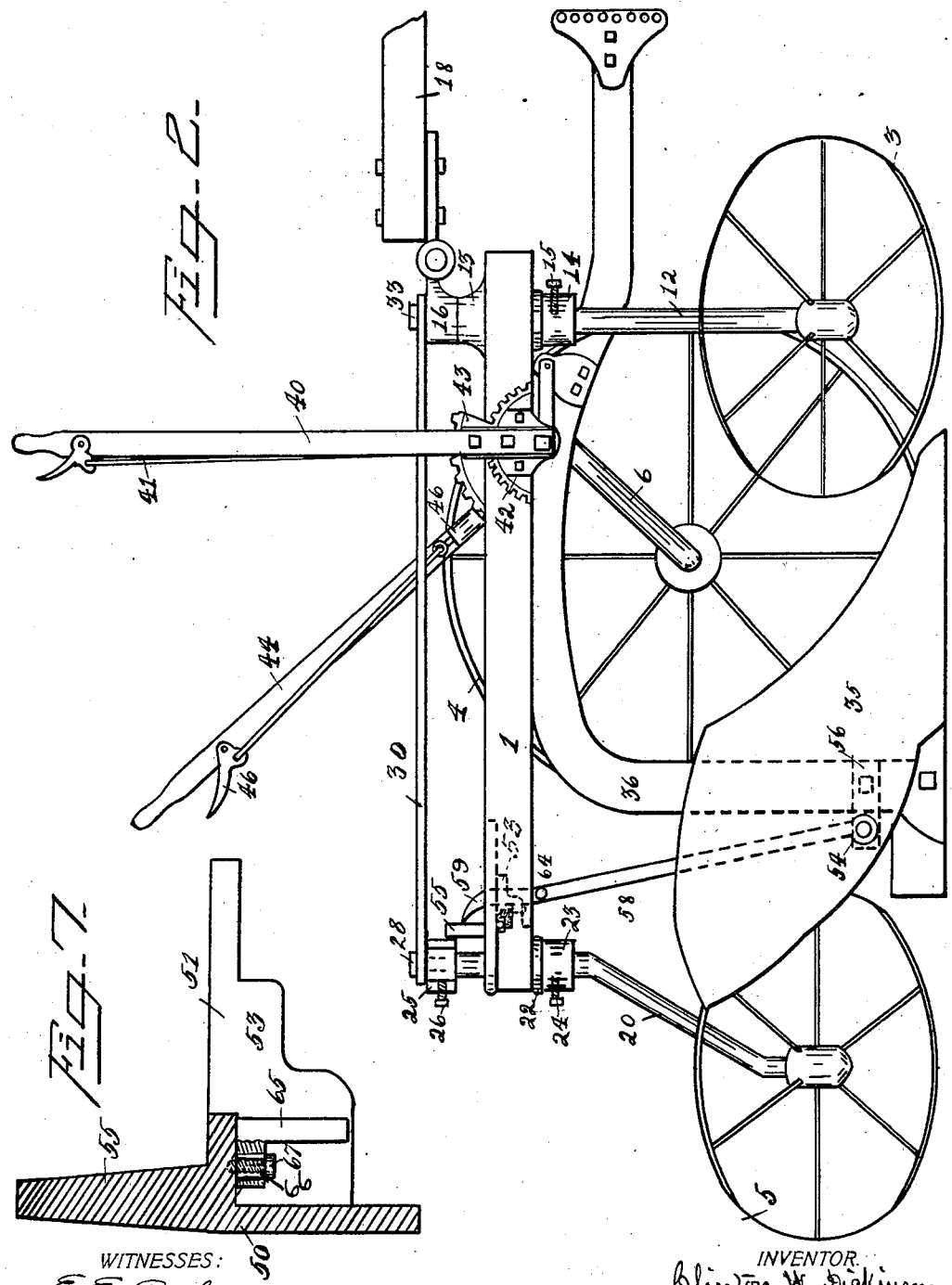

No. 674,377. Patented May 21, 1901.
C. W. DICKINSON.
SULKY PLOW.
(Application filed Apr. 9, 1900.)
(No Model.) 3 Sheets—Sheet 3.
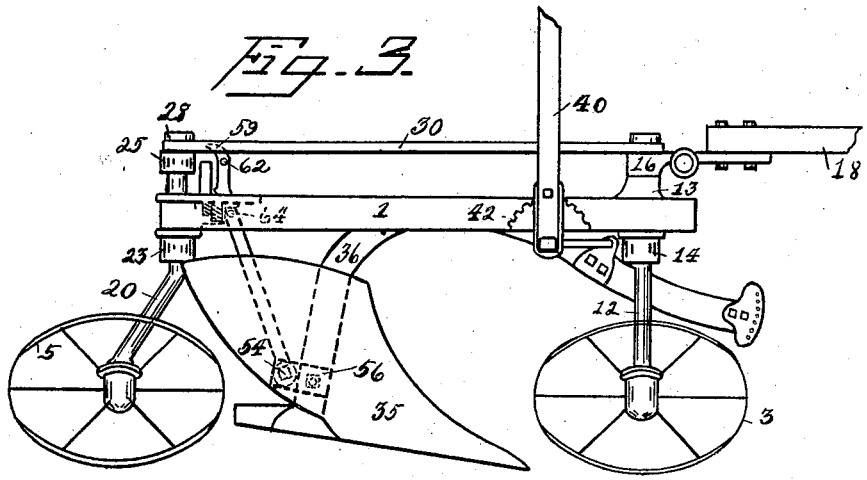
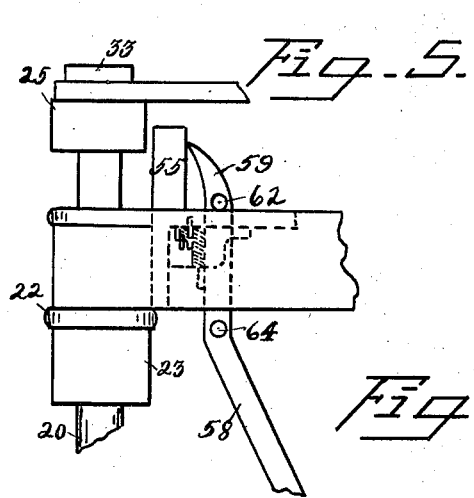
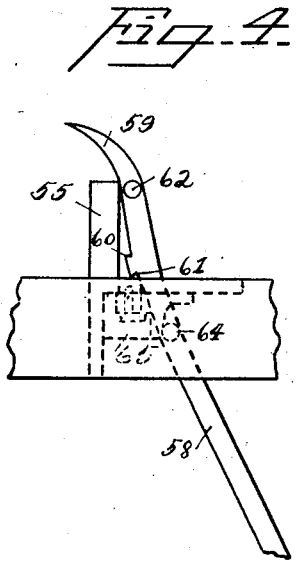
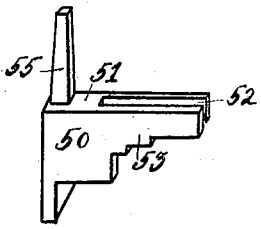
WITNESSES: INVENTOR
E. E. Cady Clinton W. Dickinson
J. Kelley BY M. M. Cady
ATTORNEY.
THE NORRIS PETERS CO., PHOTO-LITHO., WASHINGTON, D. C.

UNITED STATES PATENT OFFICE.

CLINTON W. DICKINSON, OF LA CROSSE, WISCONSIN.

SULKY-PLOW.

SPECIFICATION forming part of Letters Patent No. 674,377, dated May 21, 1901.

Application filed April 9, 1900. Serial No. 12,263. (No model.)

*To all whom it may concern:*

Be it known that I, CLINTON W. DICKINSON, a citizen of the United States, residing at La Crosse, in the county of La Crosse and State of Wisconsin, have invented certain new and useful Improvements in Sulky-Plows; and I do hereby declare the following to be a full, clear, and exact description of my invention, such as will enable others skilled in the art to which it appertains to make and use the same.

My invention relates to sulky or riding plows, and has for its object to provide means for raising, lowering, and controlling the plow, whereby the point of the plow may be more readily and speedily introduced into the ground and withdrawn therefrom; also, in providing mechanism whereby the plow may be made either rigid or flexible in the frame, as desired.

It consists, essentially, in suspending the forward part of the plow-beam on a crank and the rear end or heel of the plow from the frame by a rod or arm which is pivoted to the plow-heel and adjustably and loosely attached to the rear end of the frame, whereby when the plow is raised by the lifting of the lever the point will first be raised and then the heel, and when lowered the point will first be lowered and then the heel, and when the whole plow is in working position the heel is held down and prevented from unduly rising by said bar engaging with a plate on the rear of the plow-frame.

It also consists in means for locking and unlocking the heel of the plow, whereby when the plow is in plowing position it may be made rigid or flexible in the frame at will.

The following specification will clearly point out the manner of construction, whereby the foregoing objects and others of less importance are accomplished and their mode of operation.

In the accompanying drawings, which form a part hereof, Figure 1 is a plan view of the plow in plowing position. Fig. 2 is a side elevation of the plow from the moldboard side in plowing position. Fig. 3 is a side elevation of the plow-heel ready to fall after the point has been lowered to the ground. Fig. 4 shows a side view in detail of the mechanism for locking and suspending the heel of the plow, parts being in position for plowing with the adjustable stop for making the plow rigid in the frame out of position. Fig. 5 is a side view of the detail of the same mechanism as Fig. 4 and showing the parts when the plow has been raised and also showing the position the parts will occupy when holding up the heel of the plow. Fig. 6 is a side elevation of the bracket in the rear of the frame through which the sustaining-lever passes. Fig. 7 is a longitudinal sectional view of the same bracket.

Referring to the drawings, 1 represents the frame, which is preferably of an oblong or rectangular shape and is sustained at one side upon the wheel 4 and at the other side near the front upon the caster-wheel 3. The rear is sustained on the caster-wheel 5. To the outer side of the frame are rigidly bolted bearings or hubs 8 and 10. A crank-axletree 6, to the outer end of which is pivoted the wheel 4, passes through the hubs 8 and 10 and beneath the frame and is provided with a crank and spindle at its outer end. The wheel 3 is pivoted upon the bent axle 12, which passes up through the bearings 13, attached to the inner side of the frame near the forward end. Beneath the bearings 13 is a collar 14 around the axle and a set-screw 15 to adjust the axle in the bearings 13. Above the bearings 13 is a plate 16, secured by a set-screw to the top of the axle 12, to which plate a tongue 18 is attached.

The caster-wheel 5 is pivoted to the bent axle 20 and passes up through the bearings 22 in the rear of the frame and is supplied with the collar 23 beneath the frame and a set-screw 24 to adjust the height of the frame upon the axle 20. Near the top of the axle 20 is another collar 25, provided with the set-screw 26. At the top of the axle 20 is a plate 27, secured by the nut 28. A rod 30 connects the plate 27 with a similar plate 32, secured upon the upper end of the axle 12 by the screw 33. By means of this connecting-rod 30 the caster-wheels 3 and 5 are worked in conjunction and may be turned by the tongue in the usual manner.

The plow 35 is attached to the plow-beam 36, and the beam is secured, near its forward end, to the axle 6 by the clamping-plates 38. To the outer end of the axle 6 is attached an operating-lever 40, with the usual spring actuating-dog 41, which engages the teeth of a sector-shaped plate 42. By means of this lever and crank-axle the forward end of the plow-beam is raised, and with it the point of the plow, until the forward part of the plow-beam comes in contact with the under side of the front end of the frame, which forms a lever to raise the heel of the plow. In this manner the point of the plow will first be raised, and then when the beam strikes the under side of the frame the heel will be raised and in lowering the plow-point will first be lowered, and then the heel. Upon the other end of the axle, near the wheel 4, is secured a sector-shaped plate 43 and also a lever 44, supplied with the usual spring actuating-dog 46 for the purpose of raising and lowering that side of the frame.

For the purpose of sustaining the rear end of the plow and for suitably locking the plow down when it is in the furrow and plowing, also for the further purpose of introducing the plow-point more rapidly into the ground, there is securely bolted to the rear of the frame, upon the inside, a bracket 50, (shown in Figs. 6 and 7,) consisting of a platform 51, having therein a slot or opening 52 and at the top a vertical post 55, perpendicular to the rear of the plow-frame. Beneath the platform 51 are side plates or stops 53, whose forward edges are placed to form a fulcrum-surface for the lower pin 64 on the suspending-arm, presently to be described.

Beneath the platform 51, in the rear of the slot 52, is set a right-angled stop-piece 65, provided with an adjusting-slot 66 and a clamping-bolt 67, whereby the stop may be set forward with its front face even with the back wall of the slot 52 or removed backward out of position for the purposes presently to appear.

To the rear of the plow-beam is pivoted a suspending arm or rod 58 (shown in Figs. 4 and 5) by a pivot-pin 54, passing through the outer end of straps 56, bolted to the rear end of the plow-beam. This arm is bent near the top and terminates in a point or horn 59. Upon the outer end of the arm are formed two shoulders or catches 60 and 61, which project out a short distance upon the rear of the arm near the outer end, also two pins 62 and 64 upon the sides of the arm. The arm 58 passes up through the slot 52 in the bracket, with the point 59 turned toward the post 55. When the heel of the plow is down, it is suspended upon the pin 62, resting upon the platform 51 of the bracket and the upper shoulder 60 on the arm 58 beneath the platform and nearly in contact with the lower end 65 of the stop-piece, with the pins 64 considerably below the edges of the lower stops 53, as shown in Fig. 4.

The manner of operating my device is as follows: The operator grasps the lever 50 and draws it backward, which turns the axle 6 and raises the forward part of the plow-beam 36 upward and with it the point of the plow 35. This movement draws the heel of the plow forward, and as the horn 59 of the suspending-arm fulcrums upon the face of the post 55 the shoulder 60 will be drawn from engagement with the under side of the stop-piece 65 and will move out with the arm a short distance upon the platform. The backward pull of the lever 40 will bring the forward end of the beam into engagement with the under side of the front end of the frame and will raise the heel of the plow, pushing the horn 59 along up and over the top of the post 55, as shown in Fig. 5, and the shoulder 61 will fall into position to catch upon the upper face of the platform and the pins 64 be substantially in contact with the front edge of the lower stops 53. It will be seen by this arrangement that the point of the plow is first raised, the rear drawn forward, and then the heel of the plow is subsequently raised after the front end of the plow-beam has come in contact with the under side of the frame. In lowering the plow the operator forces forward the lever 40, which lowers the forward end of the plow-beam and with it the point of the plow until the point of the plow reaches the ground, the heel of the plow being held in the air by the shoulder 61 catching on the top of the platform, the plow being thus presented for entering the ground at a very sharp angle. In lowering the point of the plow, however, the heel is thrown backward somewhat, causing the pins 64 to fulcrum against the edge 53, which will move the shoulder 61 out of engagement with the upper surface of the platform 51, when the heel of the plow will drop by its own gravity, bringing the pin 62 of the sustaining-bar 58 down upon the top of the platform 51 and the shoulder 60 into engagement with the lower end of the stop 65. This will securely lock the heel of the plow down and make the plow practically rigid in the frame while plowing. But it may be desirable to present the plow to the ground at a still sharper angle than above described, particularly in opening first furrows. This may be readily done by throwing the operating-lever farther forward than barely to bring the point of the plow to the ground, the clamping-plate 38 being a little forward of the point of the plow. This will tilt the plow upon its point at an exceedingly sharp angle, and the draft of the team, as well as the weight of the plow-beam and plow, will force the plow down into the ground and into plowing position very quickly and very easily without the necessity of raising the front caster-wheel off the ground in the least, and the plow will be locked in a suitable plowing position, as above described.

In plowing with riding-plows it is frequently desirable not to lock the plow rigidly in the frame, but to have it somewhat loosely or flexibly hung, so as to yield a little in striking obstructions, diminishing the strain on the team and lessening the liability to breakage. If the stop-piece 65 be set back by means of the slot 66 and clamping-bolt 67, the shoulder 60 will not be checked until it rises to the under surface of the platform, and to this extent the plow, pivoting on the crank or axle, is given an oscillating or flexible movement in the frame when at work and secures the desired result.

I use the force of gravity in causing the shoulders 60 and 61 to lock in their effective positions, the top of the rod or arm 58 being sufficiently out of perpendicular for this purpose; but I can use a spring or other mechanical devices to secure the same action of the parts in whole or in part.

It will be manifest that various modifications of the structures shown may be employed and still be within the spirit of my invention; but I prefer the construction shown.

Having now described my invention, what I claim, and desire to secure by Letters Patent, is—

1. In a sulky-plow, means for sustaining and locking the heel of the plow, consisting of a bracket secured to the plow-frame, and an arm pivoted to the heel of the plow, and adapted to engage the bracket, whereby the heel of the plow is sustained when out of the ground, and locked down in plowing, as and for the purposes shown.

2. In a sulky-plow, means for sustaining and locking the heel of the plow, consisting of a bracket provided with a platform, and an upright post in combination with an arm pivoted to the heel of the plow and adapted to engage the face of said post, with means for engagement with the platform of the bracket, to sustain the heel of the plow thereon, as and for the purposes shown.

3. In a sulky-plow, means for sustaining and locking the heel of the plow, consisting of a bracket provided with a platform and slot therein, a post attached to the rear of the platform, in combination with an arm pivoted to the heel of the plow, and provided with the pin 62, and shoulders 60 and 61, whereby the heel of the plow is loosely sustained upon the shoulder 61, while the plow-point is being lowered, and firmly held down in plowing, by the shoulder 60 engaging the platform, substantially as described and shown.

4. In a sulky-plow, the combination of a frame supported on carrying-wheels, a plow-beam mounted near its forward end upon the crank-axle connected with the frame, a lever for operating said crank to raise and lower the plow, a bracket attached to the rear of the frame, and an arm pivoted to the heel of the plow and adapted to engage the bracket and suspend the heel of the plow therefrom, in an elevated position, as and for the purposes shown.

5. In a sulky-plow, a frame supported on carrying-wheels, a plow-beam attached to a crank connected with the sustaining-frame, in combination with a bracket secured to the frame, an arm pivoted to the rear of the beam and means attached to the arm for engaging the upper surface of the bracket, whereby the heel of the plow is suspended both when plowing, and when in an elevated position, as and for the purposes shown.

6. In a sulky-plow, the combination of a platform and a catch adapted to hold up the heel of the plow, while the point is being lowered, and then permit the heel to descend to working position, by its own gravity, as and for the purposes shown.

7. In a sulky-plow, means for sustaining and locking the heel of the plow, consisting of a bracket provided with a platform and slot therein, in combination with an arm, pivoted to the heel of the plow, and provided with pin 62 and shoulders 60 and 61, whereby the heel of the plow is loosely sustained upon the shoulder 61, while the plow-point is being lowered and sustained and held down in plowing by the shoulder 60 and pin 62, engaging the platform, substantially as described and shown.

8. In a sulky-plow, a frame supported upon carrying-wheels, a plow-beam attached to a crank-axle connected with said frame, a lever for operating the crank to raise and lower the plow-beam in combination with a bracket attached to the frame, and an arm pivoted to the rear of the beam, and adapted to engage the bracket, whereby the heel of the plow is held in an elevated position while the point is descending to the ground, as and for the purposes shown.

9. In a sulky-plow, a frame supported upon carrying-wheels, a plow-beam attached to a crank, connected with the sustaining-frame, in combination with a bracket, secured to the frame, an arm pivoted to the rear of the beam, and means attached to the arm for engaging the upper surface of the bracket, whereby the heel of the plow is suspended when plowing, as and for the purposes shown.

10. In a sulky-plow, a sustaining-frame supported on carrying-wheels, a plow-beam mounted at its forward end upon a crank-axle connected with the frame, a lever for operating said crank to raise and lower the plow-beam and with it the plow, in combination with means for holding the heel of the plow down when plowing, and releasing it when raising the same, consisting of a bracket secured to the frame, an arm pivoted to the heel of the plow and provided with a shoulder adapted to engage the under side of the bracket and the end of the arm being adapted to engage with the frame to release the shoulder, as and for the purposes shown.

11. In a sulky-plow, a frame supported on carrying-wheels, a plow-beam carrying a plow attached to a crank-axle connected to the frame, a lever for operating the crank for raising and lowering the plow-beam, a bracket secured to the frame, in combination with an arm pivoted to the heel of the plow and engaging the bracket to hold the plow in an elevated position, while the point is descending to the ground, and means for automatically releasing the heel, and permitting the heel of the plow to descend by its own gravity, to the ground, as and for the purposes shown.

12. In a sulky-plow, a sustaining-frame supported on carrying-wheels, a plow-beam attached to a crank-axle connected with the frame, a lever to operate the crank-axle for raising and lowering the plow, in combination with a bracket provided with a platform secured to the rear of the frame, an arm pivoted to the heel of the plow, and provided with shoulders, one adapted to engage the upper surface of the platform of the bracket, to hold the heel of the plow in an elevated position while the point is descending to the ground, and the other shoulder adapted to engage the under surface of the platform, to lock the plow down in plowing, substantially as described and shown.

13. In a sulky-plow, a sustaining-frame supported on carrying-wheels, a plow-beam attached to a crank-axle connected with the frame, a lever to operate the crank for raising and lowering the plow, in combination with a bracket having a platform, a post projecting up from the rear of the bracket, and an arm pivoted to the heel of the plow and provided with a shoulder adapted to engage the under side of the platform, said arm being bent to engage the face of said post, whereby when the plow is raised, it will be automatically unlocked by the engagement of the top of the arm with the face of the post, substantially as described and shown.

14. In a sulky-plow, a sustaining-frame supported on carrying-wheels, a plow-beam carrying a plow, attached to a crank-axle connected with the frame, a lever to operate the crank for raising and lowering the plow, in combination with a bracket having a platform, and a post projecting up from the rear of the bracket, an arm pivoted to the heel of the plow and provided with a shoulder adapted to engage the upper surface of the platform, said arm being bent to engage the face of said post, whereby when the plow is raised, the arm will pass over the top of the post, and automatically bring the shoulder into engagement with the upper surface of the platform, and hold the plow in an elevated position.

15. In a sulky-plow, a frame supported upon carrying-wheels, a plow-beam connected to the frame by raising and lowering mechanism, and a bracket attached to the frame, and provided with a post or projection above, and a stop below, in combination with an arm pivoted to the heel of the plow and provided with means for engaging the stop and post, whereby the heel of the plow is released to permit it to be both raised and lowered, as and for the purposes shown.

16. In a sulky-plow, the combination of a frame, supported on carrying-wheels, a plow-beam mounted near its forward end by raising and lowering mechanism, connected to the frame, a bracket in the rear of the frame, an arm pivoted to the heel of the plow, and provided with means for engaging the bracket, whereby the heel of the plow is sustained both in its elevated and its lowered positions, substantially as described and shown.

17. In a sulky-plow, the combination of a frame supported upon carrying-wheels, a plow-beam mounted near its forward end, by raising and lowering mechanism, a bracket in the rear of the frame, an arm pivoted to the heel of the plow and provided with means for engaging the bracket to sustain the plow both in its elevated and lowered positions, and means for automatically releasing the plow from its elevated position, substantially as described and shown.

18. In a sulky-plow, the combination of a frame, supported on carrying-wheels, a plow-beam mounted thereon, by raising and lowering mechanism connected to the frame, an arm pivoted to the plow, provided with locking mechanism thereon, and adapted to automatically come into locking relations with the frame, to hold the plow in an elevated position when raised, and to lock it in plowing position when down, with means for releasing it from its locked relations with the frame by the movement of the plow-beam, substantially as described and shown.

19. In a sulky-plow, a frame with its carrying-wheels, a plow-beam mounted toward its forward end on a crank connected to the frame, for raising and lowering the front end of the plow, the forward position of the beam arranged to come in contact with the frame to raise the heel of the plow, and means for operating the crank, in combination with an arm pivoted to the rear of the plow, with locking mechanism thereon adapted to engage with the frame, whereby the heel of the plow is raised to an elevated position, and sustained therein, while the point is being lowered to the ground, substantially as described and shown.

20. In a sulky-plow, a frame with its carrying-wheels, a plow-beam flexibly connected thereto by mechanism for raising and lowering the same, in combination with an arm pivoted to the heel of the plow, loosely engaging with the frame at its end, and provided with mechanism for sustaining and locking the heel of the plow, both in its raised and lowered positions, and arranged to automatically lock and release itself by the movement of the plow-beam, as and for the purposes shown.

21. In a sulky-plow, the combination of a bracket attached to the frame, an arm attached to the plow-beam and carrying a catch adapted to engage the bracket to hold the heel of the plow up, while the point is being lowered, and means for automatically releasing the engagement of the catch with the bracket, as and for the purposes shown.

22. In a sulky-plow means for sustaining the heel of the plow, consisting of a bracket attached to the frame, and having a platform and slot therein, and an arm pivoted to the heel of the plow and adapted to engage the upper and lower surfaces of the platform, as and for the purposes shown.

23. In a sulky-plow, a bracket attached to the frame, and having a platform with slot therein, a post on the platform, an arm pivoted to the heel of the plow and bent to engage the post, and catches upon the lever adapted to engage the upper and lower surfaces of the platform, as and for the purposes shown.

24. In a sulky-plow, a bracket attached to the frame, having a platform, a slot within the platform, an upright post in the rear of the slot, one or more stops beneath the platform, in combination with an arm pivoted to the heel of the plow, and provided with pins, one of which is adapted to engage the upper surface of the platform, and the other the stops beneath the platform, all combined as and for the purposes shown.

25. In a sulky-plow, a bracket attached to the frame, having a platform, a slot therein, an upright post in the rear of the slot, stops 53 beneath the platform, in combination with an arm pivoted to the heel of the plow, provided with side pins 62 and 64, and the shoulders or catches 60 and 61, as and for the purposes shown.

26. In a sulky-plow, a frame with its carrying-wheels, a plow-beam flexibly mounted toward its forward end on mechanism for raising and lowering the plow-beam, a bracket attached to the frame having a platform, an upright post thereon, an arm pivoted to the heel of the plow, and bent to engage the post, and a shoulder 60, upon the arm adapted to engage the lower surface of the platform, in combination with an adjustable stop 65, adapted to interpose between the shoulder 60, and the under surface of the platform, as and for the purposes shown.

27. In a sulky-plow, a frame with its carrying-wheels, a plow-beam flexibly mounted at its forward end upon mechanism for raising and lowering the plow-beam, connected with the frame, a bracket attached to the frame having a platform, an upright post upon the platform, the stops 53 beneath the platform, an arm pivoted to the heel of the plow, with its upper portion bent to engage the post, and provided with the pins 62 and 64, as and for the purposes shown.

28. In a sulky-plow, the combination of a frame supported on carrying-wheels, a plow-beam flexibly mounted thereon at its forward part, an arm attached to the rear of the beam, and adapted to come in contact with the frame, to limit the flexibility of the beam in the frame, and a stop adjustably attached to the frame to lock the beam rigidly in the frame, as and for the purposes shown.

29. In a sulky-plow, the combination of a frame supported on carrying-wheels, a plow-beam flexibly connected to the frame at its forward part by mechanism for raising and lowering the beam, an arm attached to the rear portion of the beam and provided with a shoulder or catch thereon, and adapted to engage the frame for limiting the upward motion of the rear of the beam, and a stop adjustably connected to the frame to interpose between the shoulder and the frame, to make the beam rigid in the frame at will, as and for the purposes shown.

30. In a sulky-plow, the combination of a frame supported on carrying-wheels, a plow-beam flexibly connected to the frame at its forward part by mechanism for raising and lowering the beam a bracket attached to the frame having a platform, a post thereon, stops 53, beneath, an arm pivoted to the rear of the plow-beam provided with the catches 60 and 61, and the pins 62 and 64, and the stop-piece 65, as and for the purposes shown.

In testimony whereof I affix my signature in the presence of two witnesses.

CLINTON W. DICKINSON.

Witnesses:
J. E. McCONNELL,
R. L. DICKINSON.